US012693461B2

(12) United States Patent
Sheppard

(10) Patent No.: US 12,693,461 B2
(45) Date of Patent: Jul. 28, 2026

(54) RETROREFLECTION DEFEAT FILTER

(71) Applicant: Qioptiq Limited, St. Asaph (GB)

(72) Inventor: Giles Sheppard, St. Asaph (GB)

(73) Assignee: QIOPTIQ LIMITED, St. Asaph (GB)

( * ) Notice: Subject to any disclaimer, the term of this patent is extended or adjusted under 35 U.S.C. 154(b) by 435 days.

(21) Appl. No.: 18/316,675

(22) Filed: May 12, 2023

(65) Prior Publication Data

US 2023/0280514 A1 Sep. 7, 2023

Related U.S. Application Data

(63) Continuation of application No. PCT/US2021/055705, filed on Oct. 20, 2021.

(60) Provisional application No. 63/113,940, filed on Nov. 15, 2020.

(51) Int. Cl.
*G02B 5/20* (2006.01)
*G02B 5/00* (2006.01)
*G02B 5/22* (2006.01)

(52) U.S. Cl.
CPC .............. *G02B 5/208* (2013.01); *G02B 5/005* (2013.01); *G02B 5/226* (2013.01)

(58) Field of Classification Search
CPC .......... G02B 5/208; G02B 5/005; G02B 5/20; G02B 5/22; G02B 5/226; G02B 5/003; G02B 23/12; G02B 5/04; G02B 5/045; G02B 5/12; G02B 5/122; G02B 5/124; G02B 5/136
See application file for complete search history.

(56) References Cited

U.S. PATENT DOCUMENTS

| | | |
|---|---|---|
| 2004/0057025 A1 | 3/2004 | Dewald et al. |
| 2018/0156947 A1 | 6/2018 | Staver et al. |
| 2020/0244857 A1 | 7/2020 | Pellman et al. |
| 2020/0249379 A1 | 8/2020 | Lee et al. |

FOREIGN PATENT DOCUMENTS

RU 2514161 C1 * 4/2014

OTHER PUBLICATIONS

Xia et al., "The electrically controlled light scattering performances of PLZT transparent ceramics", Ceramics International, col. 41, Supplement 1, Jul. 2015, pp. S246-S249 (Year: 2015).*
Mieremet et al., "Retroreflection reduction by masking apertures", Optical Engineering, vol. 49, Issue 4, Apr. 2010 (Year: 2010).*
International Search Report and Written Opinion mailed Jan. 31, 2022 for International Application No. PCT/US2021/055705.
International Preliminary Report on Patentability mailed May 25, 2023 for International Application No. PCT/US2021/055705.

* cited by examiner

*Primary Examiner* — Stephone B Allen
(74) *Attorney, Agent, or Firm* — K&L Gates LLP

(57) ABSTRACT

An optical system providing reduced retroreflection includes an optical element with an optic aperture. A retroreflection defeat filter has a partially obstructing material configured to absorb or reflect a subset of the optical system waveband while transmitting the rest. The partially obstructing material is arranged to occupy a first portion of the optic aperture being at least half of the optic aperture, and the partially obstructing material does not occupy a second portion of the optic aperture for the remainder of the optic aperture.

13 Claims, 10 Drawing Sheets

An example 7-element telecentric lens

420

400

Spatial filtering at the lens stop, obscuring 50% of the aperture

350

420

400

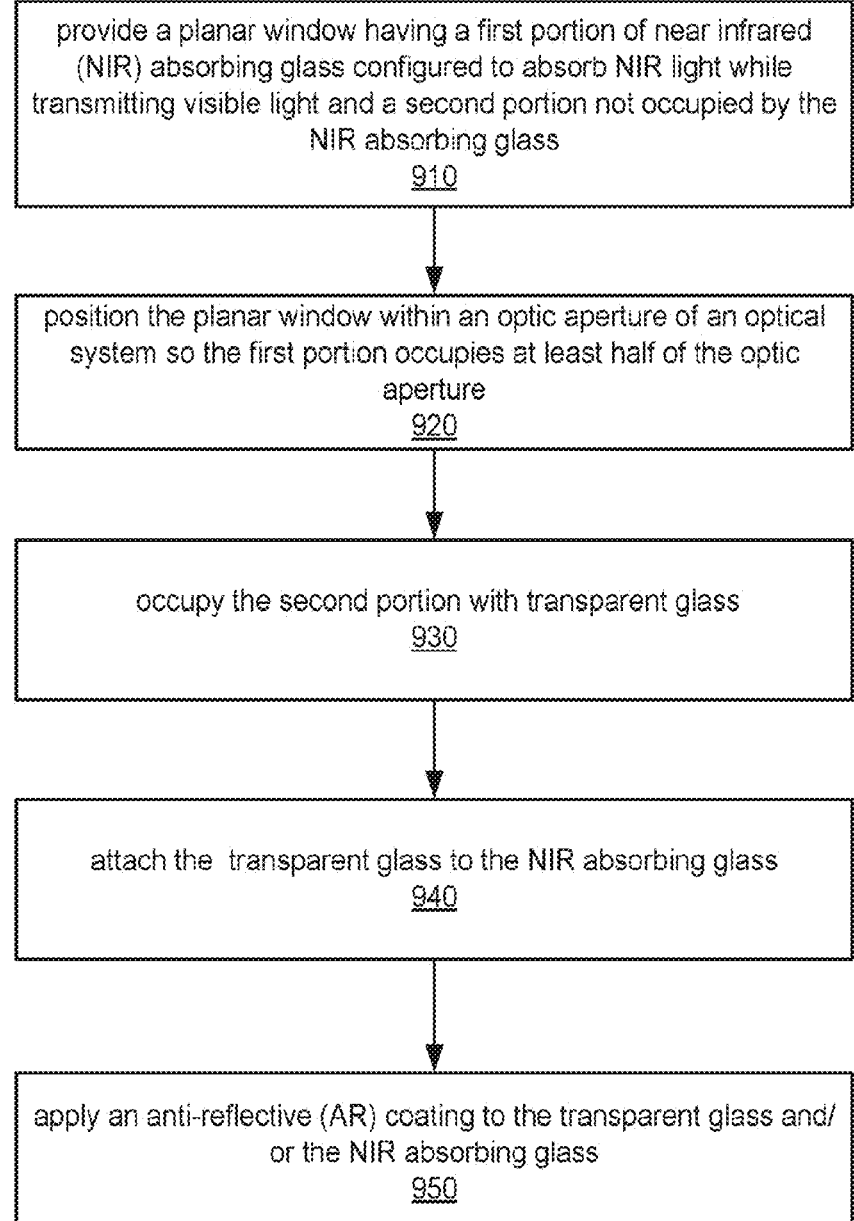

provide a planar window having a first portion of near infrared (NIR) absorbing glass configured to absorb NIR light while transmitting visible light and a second portion not occupied by the NIR absorbing glass
910 position the planar window within an optic aperture of an optical system so the first portion occupies at least half of the optic aperture
920 occupy the second portion with transparent glass
930 attach the transparent glass to the NIR absorbing glass
940 apply an anti-reflective (AR) coating to the transparent glass and/or the NIR absorbing glass
950

RETROREFLECTION DEFEAT FILTER

CROSS-REFERENCE TO RELATED APPLICATIONS

This application claims priority under 35 U.S.C. § 120 to and is a continuation of International Application No. PCT/US2021/055705, filed Oct. 20, 2021, entititled "Retroreflection Defeat Filter," which claims the benefit of U.S. Provisional Patent Application Ser. No. 63/113,940, filed Nov. 15, 2020, entitled "Hybrid Retroreflection Defeat Filter," each of which is incorporated by reference herein in its entirety.

FIELD OF THE INVENTION

The present invention relates to an optical device, and more particularly, is related to controlling retroreflections from an optical device.

BACKGROUND

Retroreflection is a well-known optical phenomenon, where light emitted by a source is incident upon an optic and is then reflected back towards the source in the opposite direction. This can be problematic in a military environment, as a retroreflection from an optic can reveal the position of a user of the optic. For example, retroreflection may allow a user wearing night vision goggles (NVGs) to be seen by a low light security camera that incorporates a near-infrared (NIR) illuminator, as shown by FIGS. 1A-B. In FIG. 1A, a camera directed at bushes is unable to detect a man hidden in the bushes. If the man is using NVGs, as shown in FIG. 1B, the illumination from the camera may be retroreflected back towards the camera, which appears as a bright spot.

A spatial filter may be used to reduce the retroreflection signal via partial obscuration of an aperture of an optical system. Depending upon the optical design of the optic to be protected, different fractions of the total aperture may be blocked, where a blockage of 50% of the total aperture is the theoretical minimum required for total elimination of the retroreflection signal. However, since a significant part of the aperture is obscured, the user experiences a significant loss of sensitivity of their NVG, reducing the ability of the user to see in the dark.

Alternatively, a frequency filter can be used to reduce the retroflection signal by removing the relevant wavelengths. In order for the frequency filter to remove the relevant wavelengths, the waveband in which there is a retroreflection threat must either be a sub-band of the waveband to be imaged, or waveband in which there is a retroreflection threat must not overlap the waveband to be imaged at all, as shown in FIG. 5, and disclosed further below. If the waveband of the retroreflection threat entirely overlaps the imaging waveband, all the light must be filtered, rendering the imager useless. Both methods of reduction have a significant impact on the performance of the imager to be protected, therefore there is a need to address the abovementioned issues.

SUMMARY

Embodiments of the present invention provide a retrore-flection defeat filter. Briefly described, the present invention relates to an optical system providing reduced retroreflection. An optical element has an optic aperture. A retrore-flection defeat filter has a partially obstructing material configured to absorb or reflect a subset of the optical system waveband while transmitting the rest. The partially obstructing material is arranged to occupy a first portion of the optic aperture being at least half of the optic aperture, and the partially obstructing material does not occupy a second portion of the optic aperture for the remainder of the optic aperture.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 9 is a flowchart of an exemplary method for making an optical system with reduced retroreflection.

DETAILED DESCRIPTION

Figures 1A, 1B:
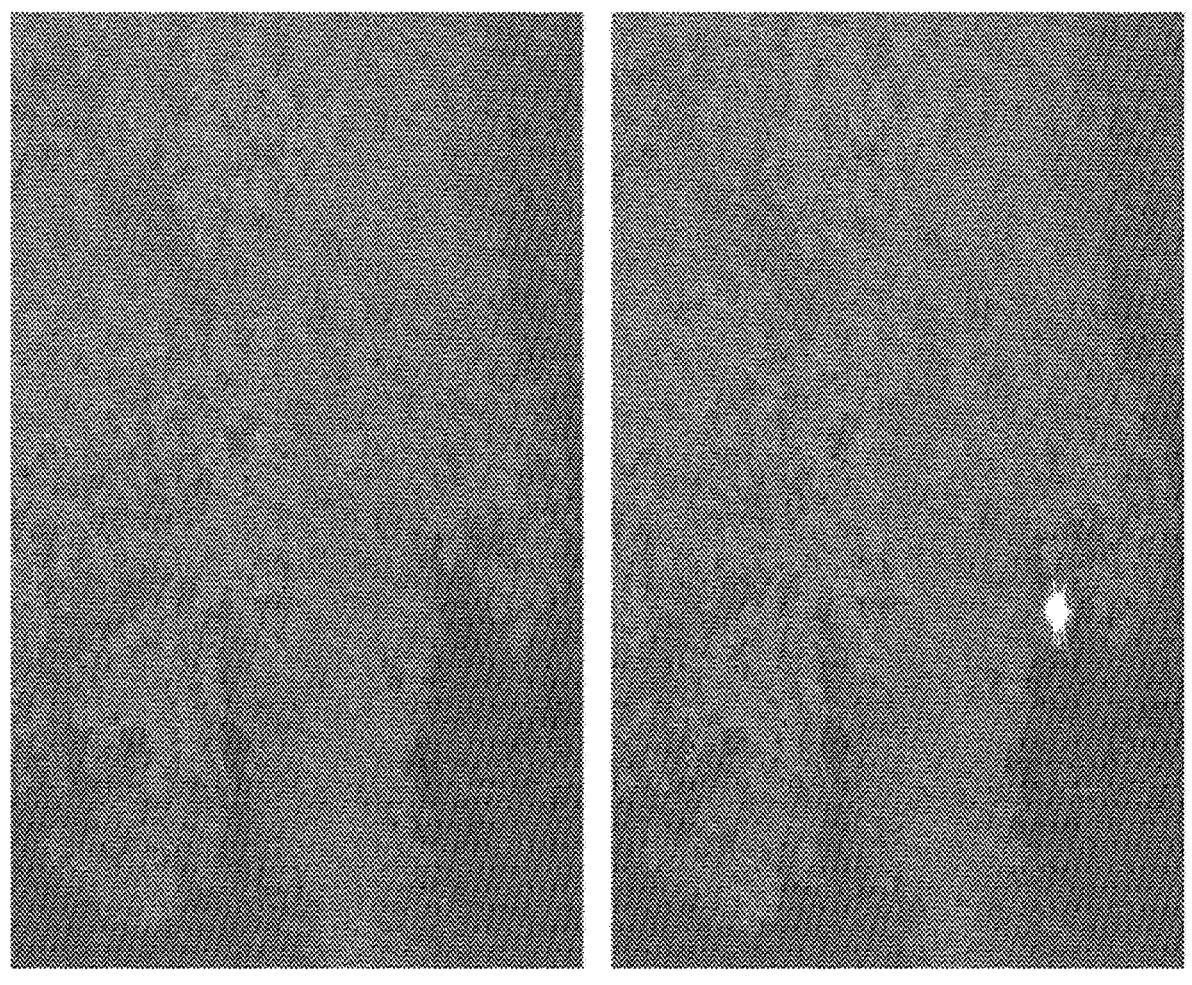
FIG. 1A is a photograph of a landscape having a concealed user.
FIG. 1B is the photograph of FIG. 1A showing a retrore-flection from an NVG compromising the position of the user.

The following definitions are useful for interpreting terms applied to features of the embodiments disclosed herein, and are meant only to define elements within the disclosure.

As used within this disclosure, "substantially" means within normal manufacturing tolerances. For example, a substantially planar object would be planar with the possible exception of minor irregularities within accepted manufacturing tolerances.

As used within this disclosure, "partially obstructing material" for an optical system refers to material configured to absorb or reflect a portion of the waveband of the system while transmitting the rest. For example, a filter glass may be configured to absorb NIR light and transmit visible light.

As used within this disclosure, 'transparent' means mostly transmitting in the system waveband. For example, Germanium, which is opaque to the eye, transmits in the long and mid wave infrared. Reference will now be made in detail to embodiments of the present invention, examples of which are illustrated in the accompanying drawings. Wherever possible, the same reference numbers are used in the drawings and the description to refer to the same or like parts.

Figure 2:
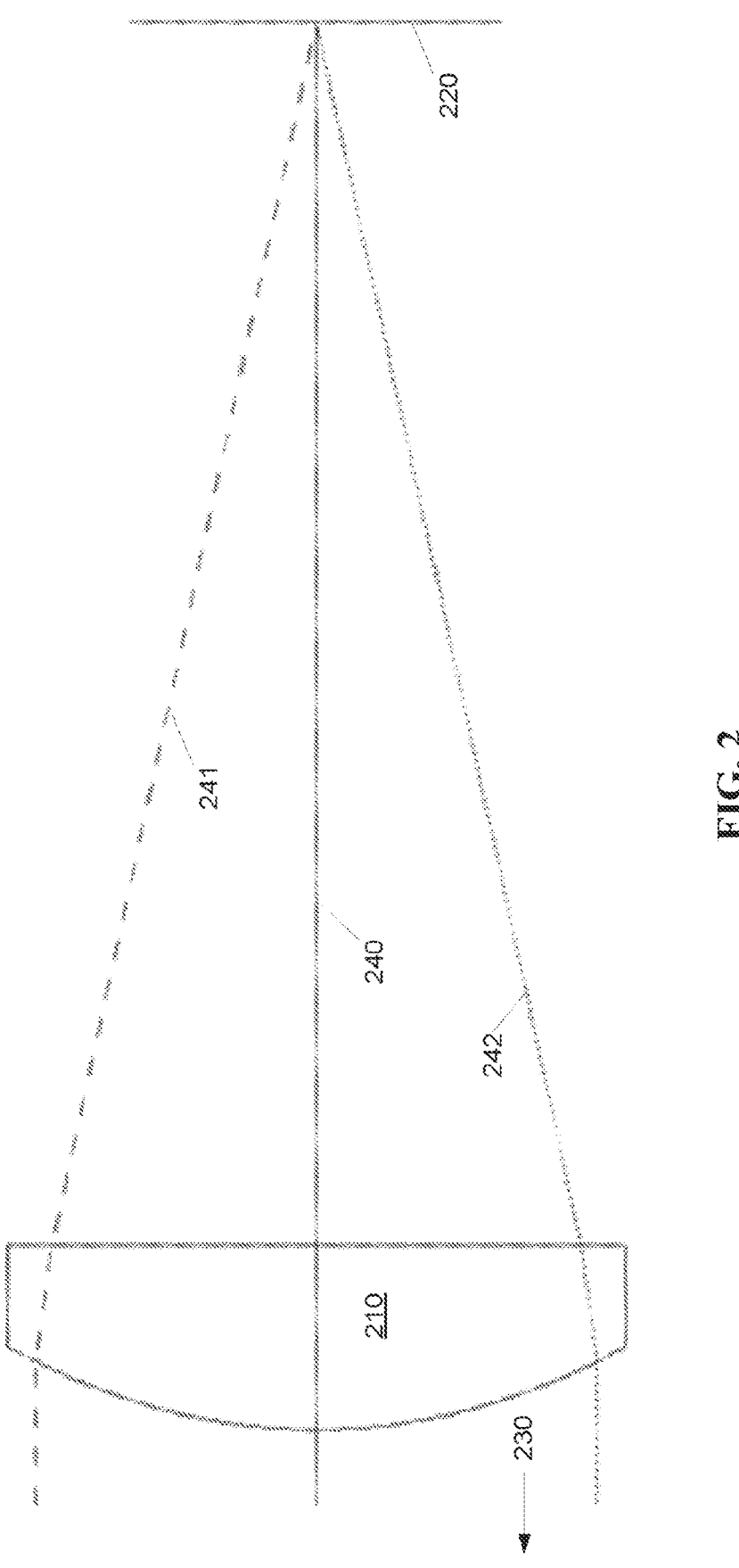
FIG. 2 is a schematic diagram illustrating an on-axis retroreflection with a first path indicated by a dashed line (top) and a second path indicated by a dotted line (bottom).

Exemplary embodiments of the present invention incorporate aspects of spatial filters and frequency filters. FIG. 2 shows a simple lens 210 looking at a source 230 at infinity, on-axis 240. Light incoming from the source 230 along the dashed path 241 is reflected at the image plane 220 and sent back towards the source 230 along the dotted path 242. Likewise, light incoming along the dotted path 242 is reflected at the image plane 220 and sent back towards the source 230 along the dashed path 241. Any ray which is retroreflected must pass though both halves of the aperture of the lens 210, meaning all retroreflection can be prevented by covering one half of the aperture.

When the light is incident off-axis the same logic applies, but the incoming and outgoing rays are not symmetric across the exact centre of the lens. For this reason, an obscuration of more than half of the aperture may be required to completely eliminate retroreflection. The change in retroreflection characteristic with field angle is dependent on the lens design of the user's optic, for this reason the optimum aperture mask varies across different optical systems.

Figure 3A:
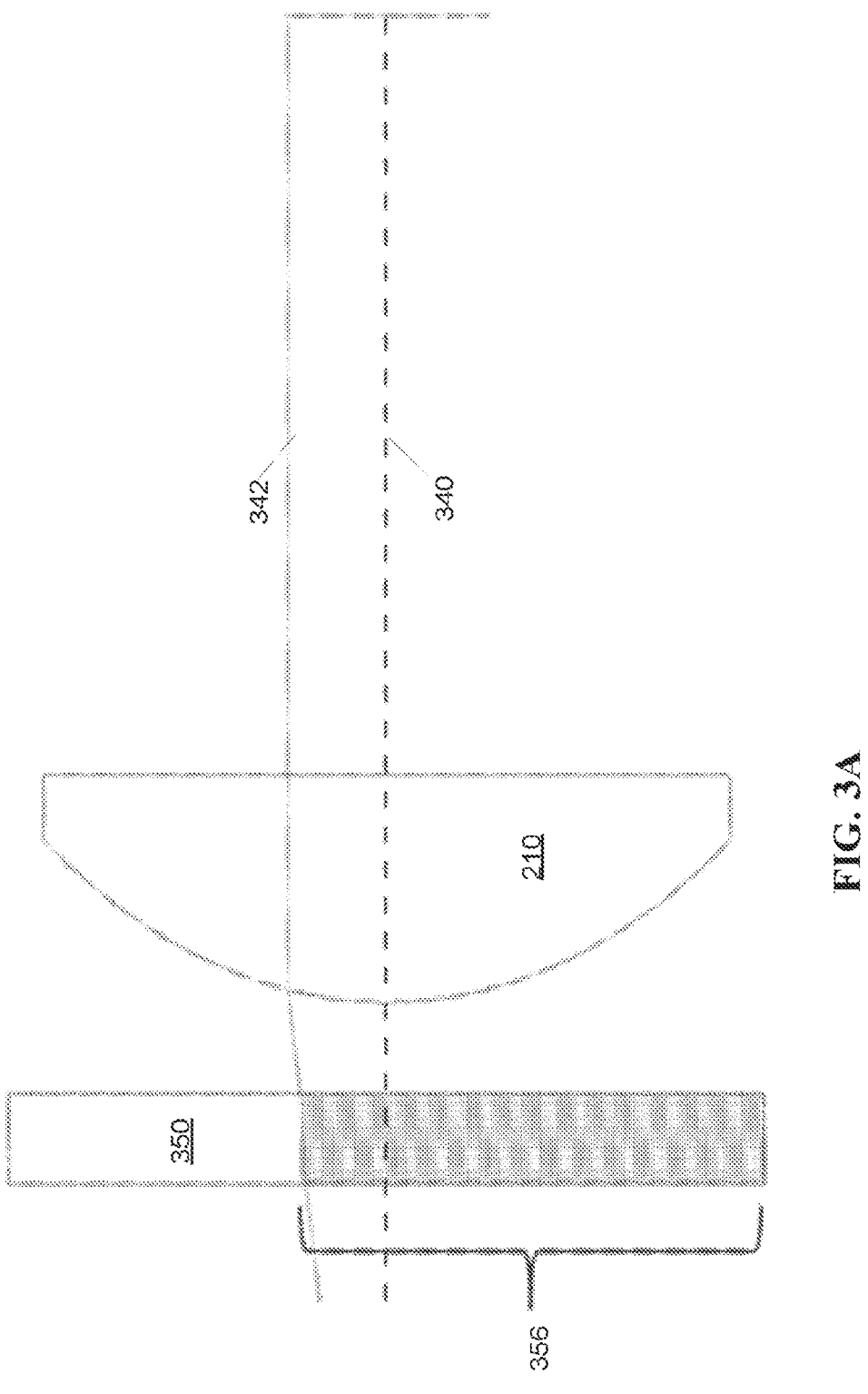
FIG. 3A is a schematic diagram illustrating a spatial filter an obscuration of greater than 50% to eliminate retroreflection.

The amount of obscuration of the aperture needed to eliminate retroreflection may be calculated by finding the rays that are normally incident on the image plane over the field of view. This can be done in optical software, or by physical experimentation. The software calculation is performed by finding the angle of incidence of, as a starting point, the chief ray at a particular field. Iteration through the pupil coordinates may then be used to find the normally incident ray for that field. The obscuration that blocks all normally incident rays (and the remaining larger half of the aperture) is then the obscuration sufficient to wholly eliminate retroreflection. If there is no normally incident ray within the pupil, there is no retroreflection at that field point. An example of this principle is shown in FIG. 3A. A 50% obscuration of the aperture would block all of the retroreflection in the axial field, as shown by the dashed ray 340 running through the exact centre of the full system. To block retroreflection at maximum field, a solid ray 342 must also be blocked, obscuring more than 50% of the pupil. A possible location for a filter 350 in front of the lens 210 is shown. Since the solid ray 342 is not parallel to the axis 340 in object space, the required size of an obscuration 356 provided by the filter 350 may vary with the position of the filter 350.

Figure 3B:
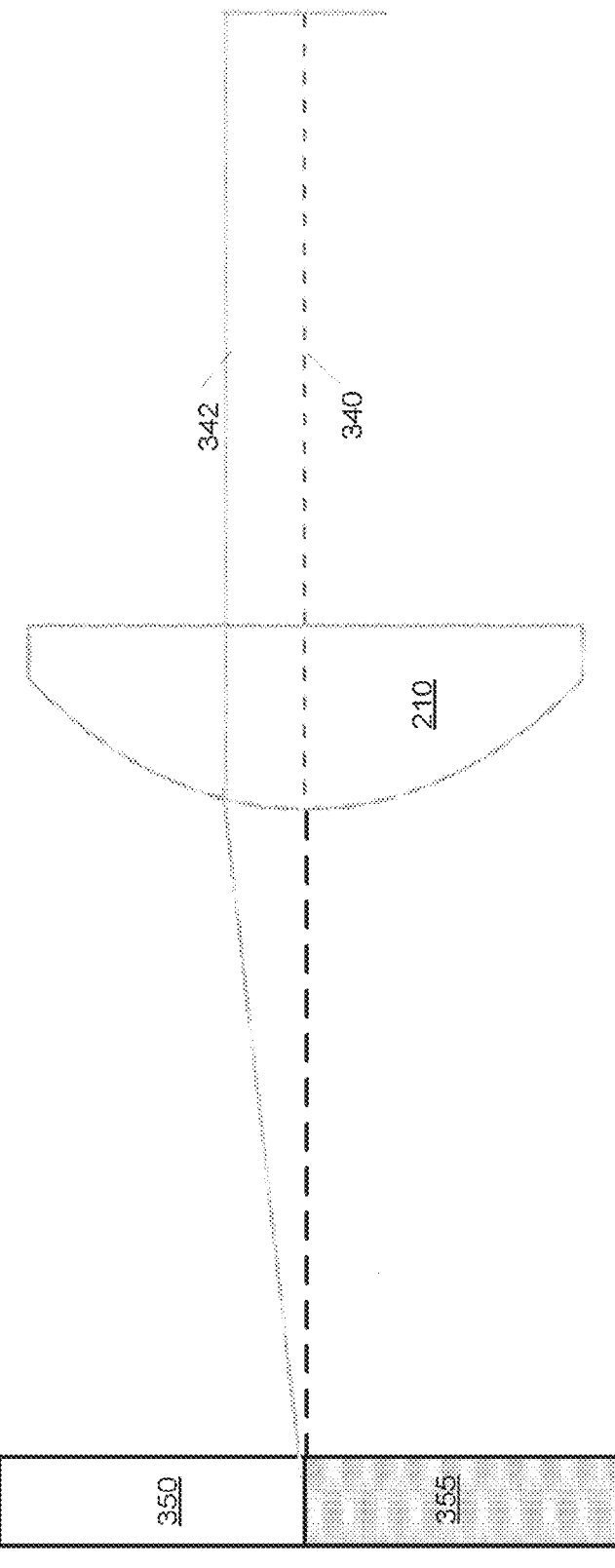
FIG. 3B is a schematic diagram illustrating an alternative location for a 50% obscuration spatial filter for the optical system of FIG. 3A.

An ideal position of the filter 350 is where the rays normally incident on the detector cross each other, as at this point the obscuration can be 50%. As shown in FIG. 3B, this ideal position of the filter 350 would be significantly farther in front of the lens 210 than the location shown in FIG. 3A. FIG. 3B shows the position of the filter 350 having a 50% obscuration 355 would be significantly farther from the lens 210 than the position of the filter 350 having an obscuration 356 (FIG. 3A) greater than 50%. As a result, there is a trade-off between space envelope and filter transmission, due to the variation in the required amount of obscuration for the spatial filter 350 with respect to the distance of the spatial filter 350 from the lens 210. Depending on the design of the optical system to be protected, all of the normally incident rays may not cross at a single point; the size of the region where the rays cross the filter determines the practicality and effectiveness of using a spatial filter 350 for a given application.

Figures 4A, 4B:
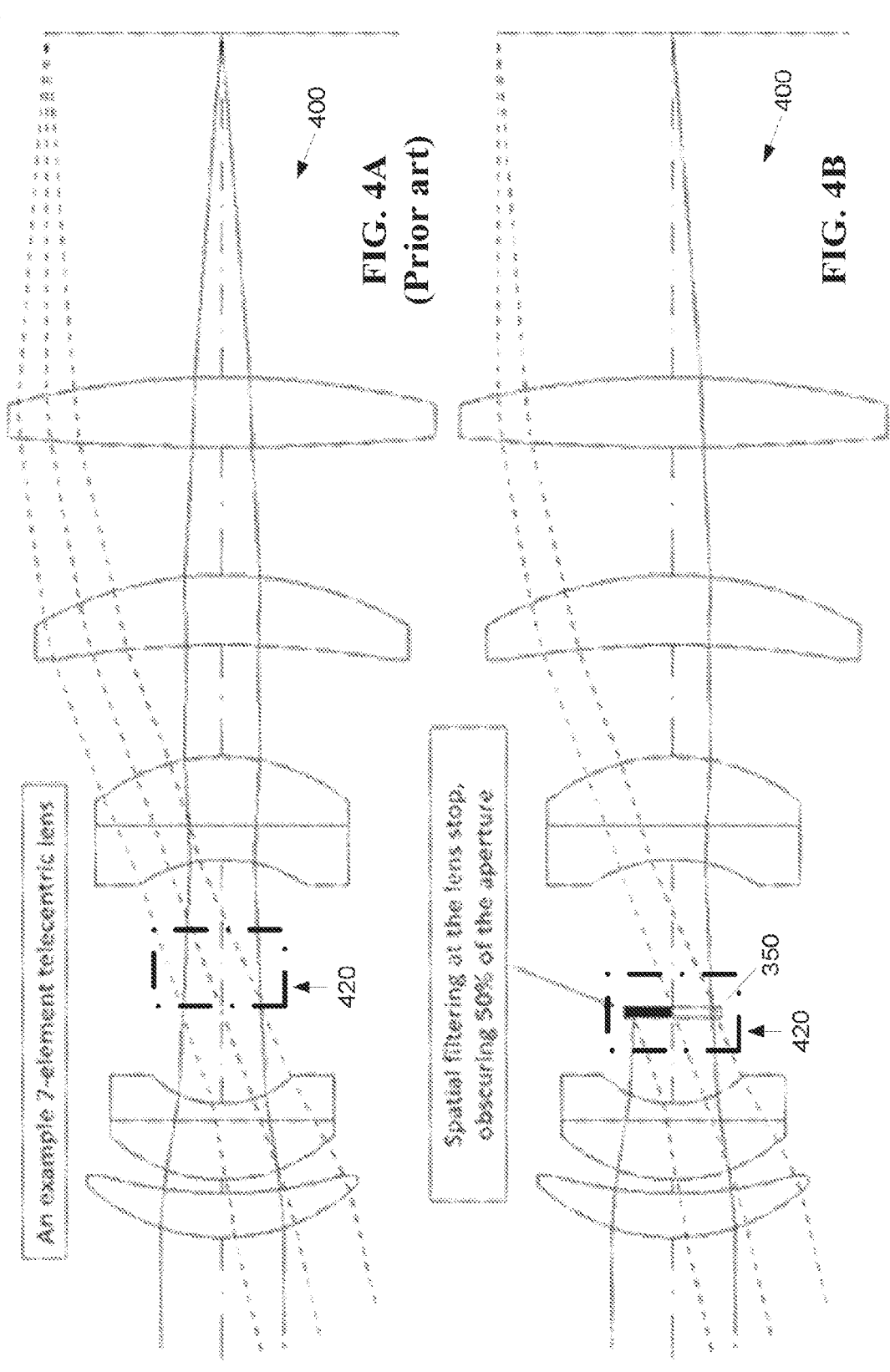
FIG. 4A is a schematic diagram illustrating a prior art telecentric lens.
FIG. 4B is a schematic diagram illustrating the telecentric lens of FIG. 4A with a spatial filter located at the stop.

The concept regarding the relationship in a spatial filter between the amount of obfuscation with respect to filter location can be extended to filters within an optical system, as shown by FIGS. 4A-B. FIGS. 4A-B show an example of a telecentric optic 400, with a spatial filter 350 implemented at the aperture stop 420. This configuration allows the obscuration factor to reach the theoretical minimum of 50%, as the rays that are normally incident on the detector all pass through the centre of the stop (telecentricity) 420. While the retroreflection filter may be implemented internally within a lens system, for example as shown by FIGS. 4A-B (not at the exit aperture but at the optical stop or elsewhere in the system), alternatively retroreflection filter may be attached to the front of a protected product, such as NVG.

Figure 5:
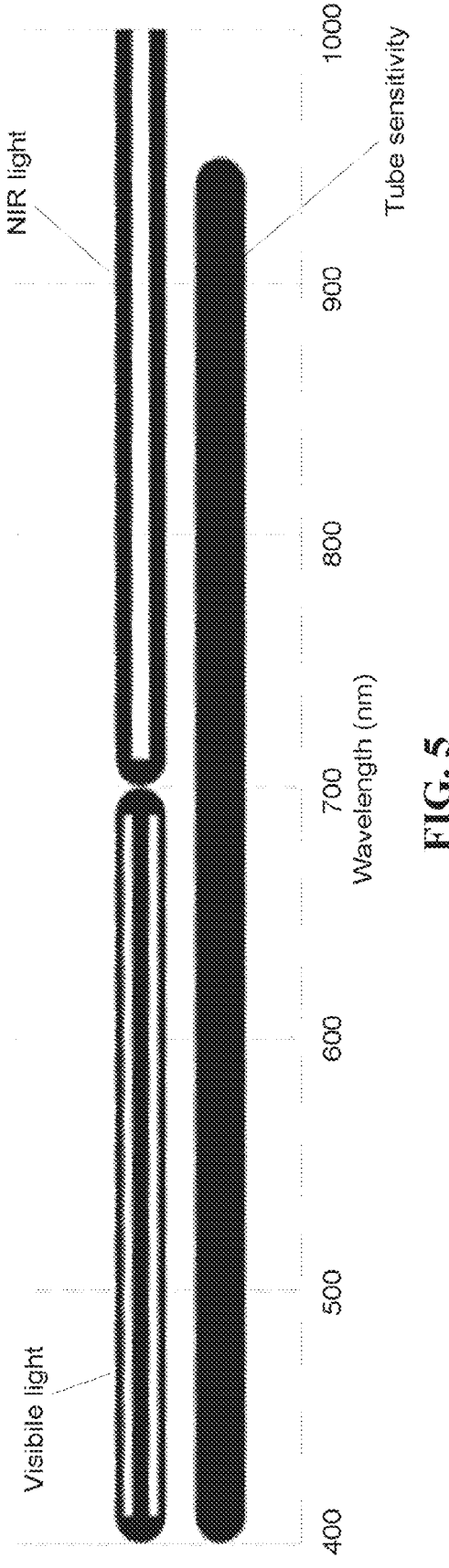
FIG. 5 is a plot showing wavebands of interest in an NVG/NIR camera scenario.

In the above-described scenario, the NVG of the user is sensitive to light in both the visible and NIR spectra, while the illumination that causes the retroreflection signal is only in the NIR spectrum. FIG. 5 indicates wavebands of interest in the NVG/NIR camera scenario. By filtering out the NIR light (via reflection or absorption) the retroreflection is eliminated, however, here the user loses the ability to use their own NIR devices (pointers and illuminators). The user can still see via visible light, but with reduced signal, reducing their ability to see in the dark.

Figure 6:
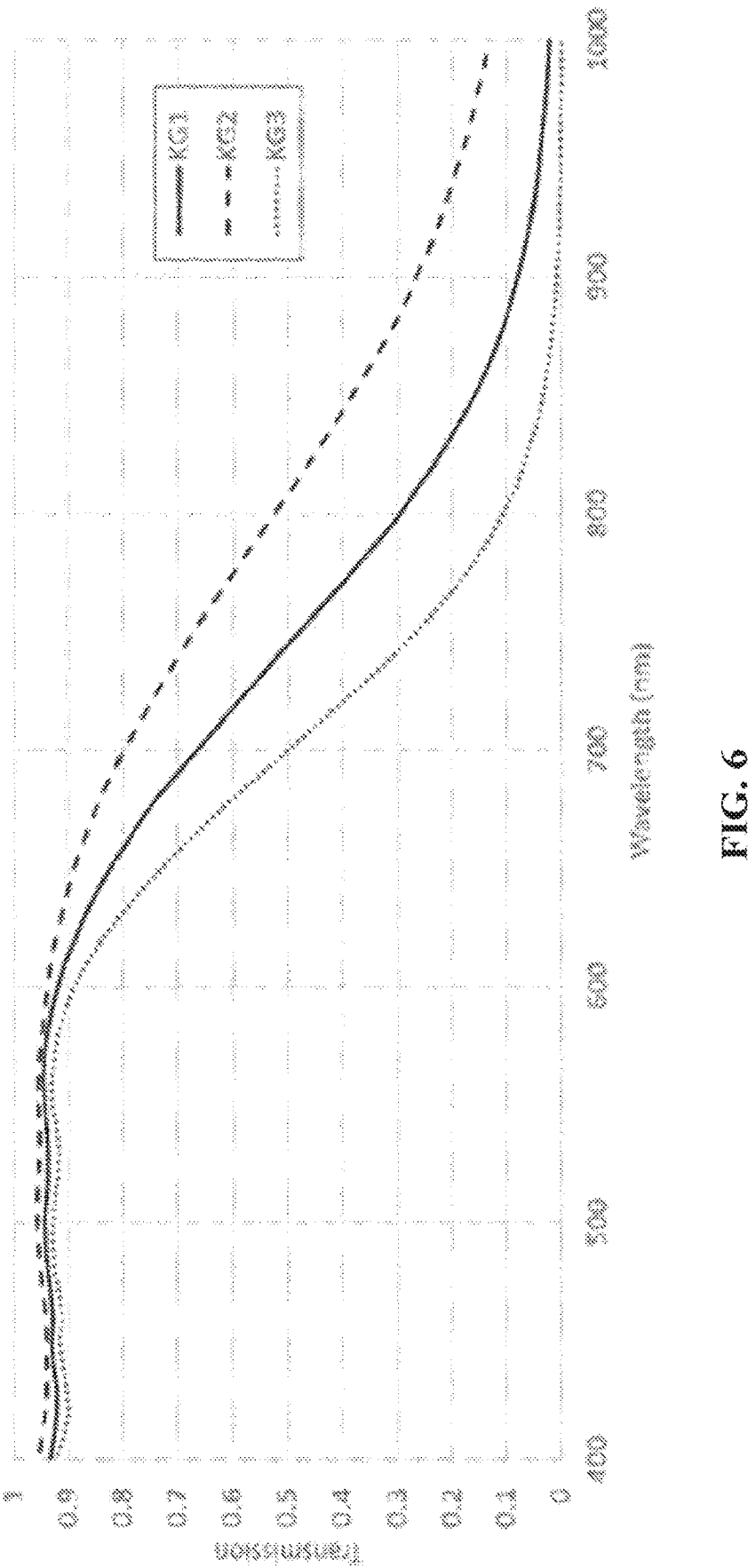
FIG. 6 is a plot showing the effect of NIR absorbing glass.

FIG. 6 is a plot that shows three NIR absorbing glass types suitable for absorbing NIR light while transmitting visible light, here KG1, KG2, KG3, for example, manufactured by Schott Glass. As shown in FIG. 6, filter glass does not have a sharp transition between absorption and transmission. As a result of this gradual change, some NIR light will still be retroreflected, and some visible light will be absorbed. Therefore, it is desirable to find a compromise solution between retroreflection reduction and maximisation of transmission in the imaging waveband.

Alternatively, a dichroic coating (e.g., ThorLabs FES series of shortpass coatings) may be used instead of absorbing glass. However, while using of a dichroic coating may provide a steeper transition between absorption and transmission (which allows a better trade-off between transmission and retroreflection reduction), use of a dichroic coating solution results in the light in the retroreflection band being reflected, which is not desirable as described previously. The path of the reflected light can be controlled by, for example, tilting the filter, at the cost of extra design effort.

Figure 7:
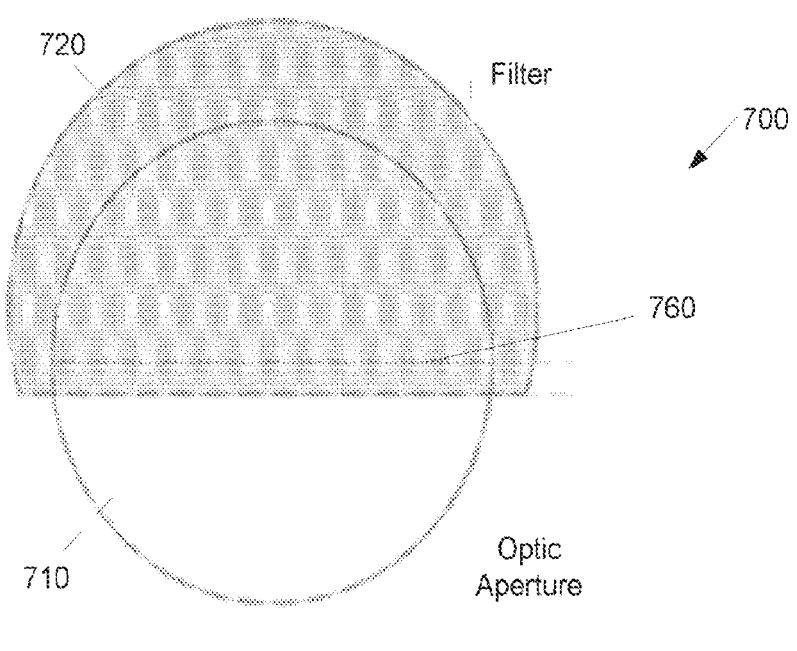
FIG. 7 is a schematic of a retroreflection filter under a first exemplary embodiment.

As noted above, the exemplary embodiments of the present invention provide complementary benefits of spatial filters and frequency filters. The embodiments effectively provide increased the transmission in comparison of a spatial filter or a frequency filter, allowing the user to see better in the dark. Under a first embodiment, shown in FIG. 7, a hybrid filter 720 for an optic 700 uses a NIR absorbing glass instead of a spatial filter having an opaque aperture mask. Use of NIR absorbing glass for the hybrid filter 720 instead of an opaque aperture mask allows the optic aperture 710 of the optical system incorporating the hybrid filter 720 to collect all visible light instead of blocking a portion of the visible light, improving imaging performance for the user, while eliminating retroreflection from the NIR band of the NIR absorbing glass. A center line 760 demarking 50% of the optic aperture 710 is indicted by a dotted line. The hybrid filter 720 also offers performance benefits over the frequency filter solution, as the NIR band is visible through a part of the aperture, improving sensitivity and allowing NIR sources to be seen clearly.

For example, under the first embodiment an implementation may include a substantially planar 2 mm thick window 720 made of KG3 or KG5 glass (available from SCHOTT). The edge of the hybrid filter 720 is positioned 5 mm over centre on the NVG optical aperture 710. The glass is coated with a standard anti-reflective (AR) coating (e.g., a multilayer AR comprised of TiO2 and SiO2). The spatial filter 700 may be incorporated within an optical system such as an NVG (not shown) and may be held within a housing ring that can be screwed into the NVG housing.

Since the NIR glass of the filter 720 only covers a portion of the aperture 710, most retroreflected rays only pass through the absorbing glass once. The thickness and glass type are therefore altered accordingly to provide the same level of absorption in single pass, compared to a full aperture solution in double pass. This may be accomplished by plotting the absorption curves and manually adjusting the thickness and material, and/or by numerical optimization. If additional accuracy is desired, the obscuration factor can be included in the calculation, although it should be noted that the obscuration factor of the filter is likely to vary across the field of view, dependent on the optic to be protected.

Figure 8:
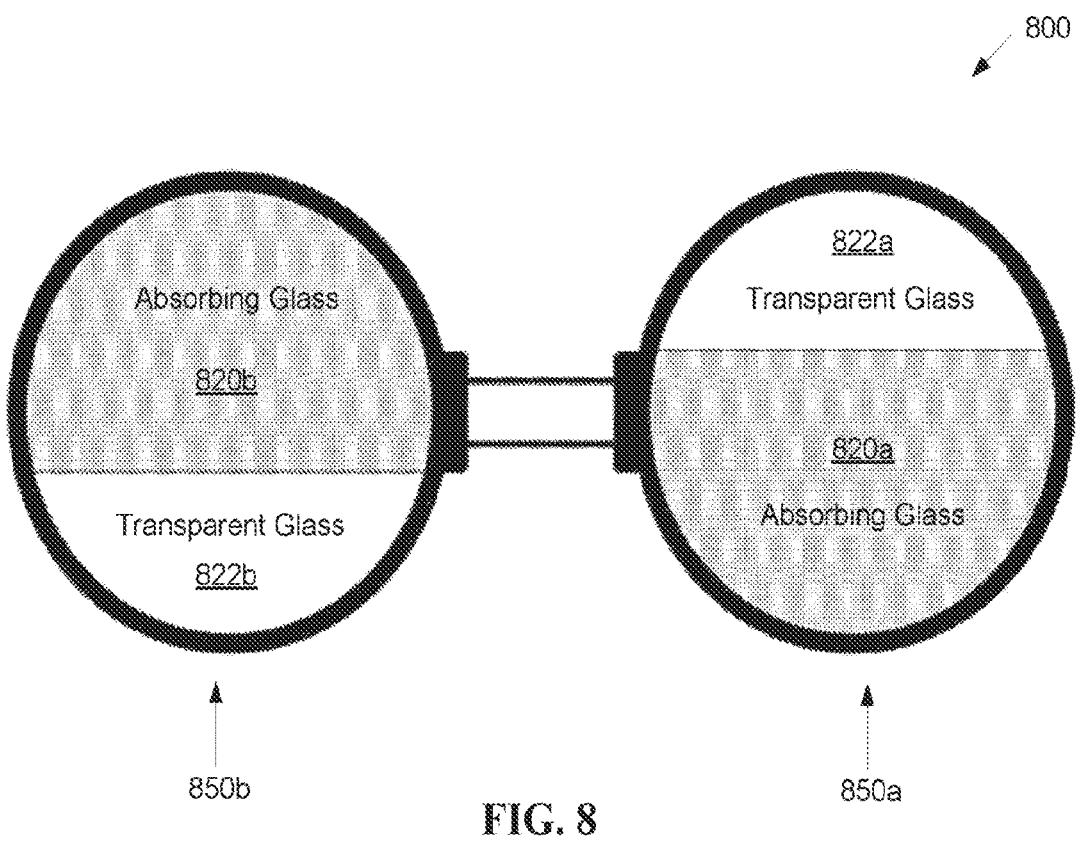
FIG. 8 is a schematic diagram of a third exemplary embodiment of an optical device having a bonded, full aperture design, coupling of two filters to maintain a fixed orientation.
Figure 10:
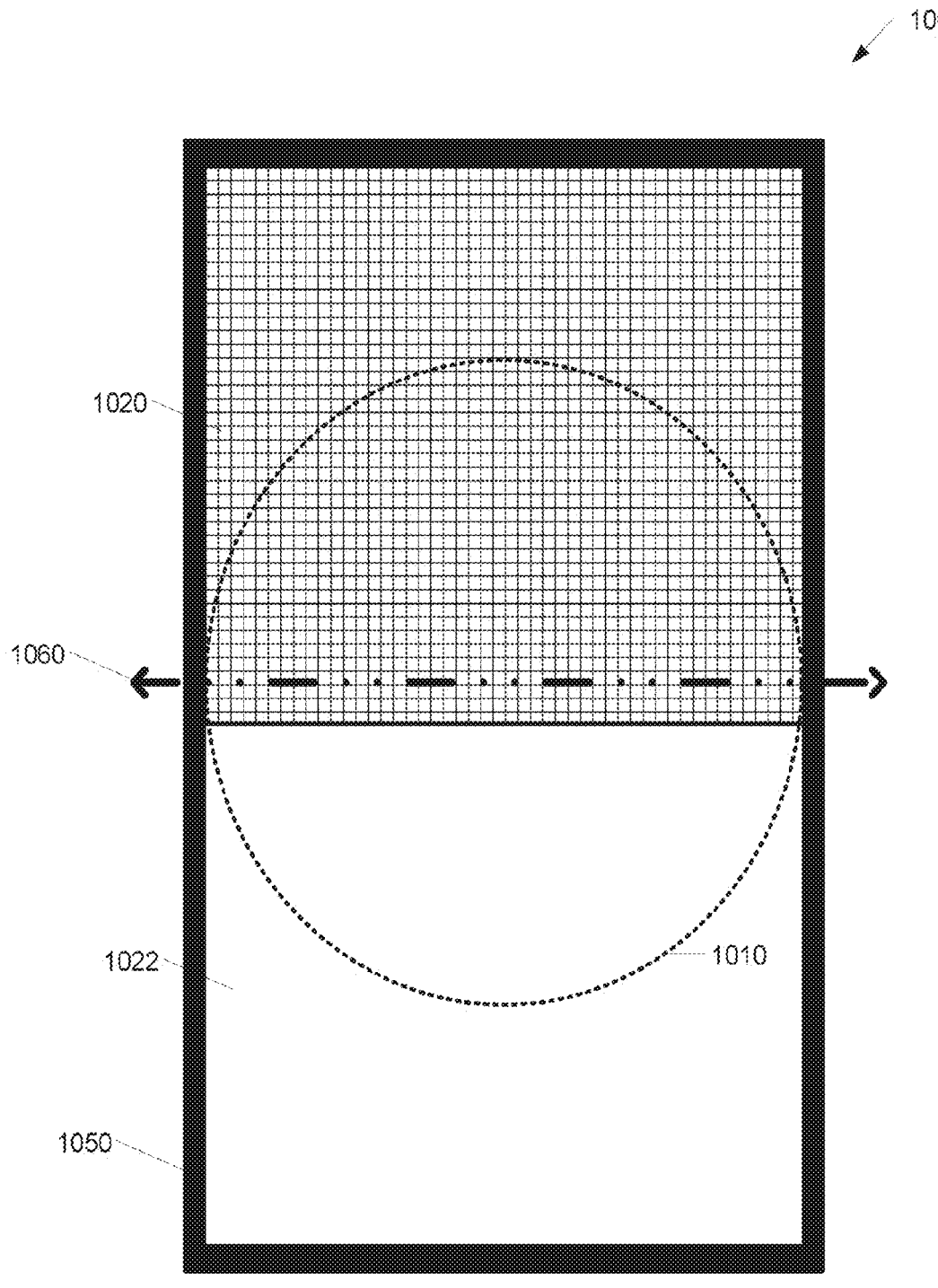
FIG. 10 is a schematic of a retroreflection filter under a third exemplary embodiment.

As shown by FIG. 8, under a second embodiment 800 of the invention, an optical filter component 850a combines the filter 820a of the first embodiment with an additional piece of transparent glass 822a attached to the filter 820a, for example the additional piece of transparent glass 822a cemented to the filter 820a, among other possible attachment means. The additional piece of transparent glass 822a allows the filter component 850a to cover the entire optical aperture, reducing the ingress of dirt. For example, in binocular applications, such as NVGs, two filter components 850a, 850b are used, one for each aperture. As shown by FIG. 8, the two filter components 850a, 850b may be arranged in opposite orientations: a first filter component 850a with absorbing glass 820a at the bottom, and a second filter component 850b with the absorbing glass 820b at the top and an additional piece of transparent glass 822b at the bottom. Since the effect of the partial aperture is not uniform over the field of view, this allows the loss of performance to be balanced between the eyes of the user. Under the second embodiment, a mount may hold two devices over two apertures in a fixed orientation (e.g., one up, one down as shown by FIG. 8), While the embodiments described and depicted above are generally directed to a disc shaped retroreflection filter, in other embodiments the filter may be configured differently. For example, FIG. 10 shows a third exemplary embodiment having rectangular shaped retroreflection filter 1000 mounted within an optional housing 1050 (or frame) to be disposed at a selected portion of an optical system, for example, at an optic aperture 1010 (such as a stop) of the optical system. FIG. 10 depicts a cross section of the optic aperture 1010. A center line 1060 demarking 50% of the optic aperture 1010 is indicted by a dotted line. The retroreflection filter is positioned with respect to the optic aperture 1010 such that a first portion 1020 of the retroreflection filter 1000 occupies at least 50% of the optic aperture 1010. The first portion 1020 of the retroreflection filter is formed of a NIR absorbing material, for example NIR glass. The remainder of the optic aperture 1010 is not covered by the NIR absorbing material. For example, a second portion 1022 of the retroreflection filter 1000 may be substantially transparent, for example, either transparent glass or unoccupied.

Under the third embodiment, the retroreflection filter 1000 may by larger than the optic aperture 1010, so that coverage of the optic aperture 1010 by the first portion 1020 of the retroreflection filter 1000 may be varied by repositioning the retroreflection filter 1000 with respect to the optic aperture 1010, for example, translating the retroreflection filter 1000 in the plane of the filter 1000 in a direction normal to the center line 1060 of the optic aperture 1010.

While FIG. 10 shows the perimeter of the retroreflection filter 1000 as being rectangular, in alternative embodiments the perimeter of the retroreflection filter 1000 may be other shapes, for example, another polygon, circular, or irregular, as desired to facilitate mounting the retroreflection filter 1000 with respect to the aperture 1010 of the optical system.

Other variations are also possible, for example, while the above embodiments describe and depict the NIR absorbing portion of the retroreflection filter filling a contiguous portion of the optic aperture, in alternative embodiments the NIR absorbing portion of the retroreflection filter may not be contiguous.

The embodiments described above provide a retroreflection defeat device providing benefits of both spatial and frequency filtering by removing a sub-band of the imaged waveband over a fraction of 50-90% of the optical aperture. The device may be positioned at various locations in an optical system, for example, as a filter attached to the front of a protected product, or implemented internally within a lens system (not at the exit aperture but at the optical stop or elsewhere in the system). Advantageously, the device maximizes transmission while reducing retroreflection.

FIG. 9 is a flowchart of an exemplary method 900 for making an optical system with reduced retroreflection. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A planar window is provided having a first portion of near infrared (NIR) absorbing glass configured to absorb NIR light while transmitting visible light and a second portion not occupied by the NIR absorbing glass, as shown by block 910. The planar window is positioned within an optic aperture of the optical system, wherein the first portion occupies at least half of the optic aperture, as shown by block 920. The second portion may optionally be occupied with transparent glass, as shown by block 930. The transparent glass may be attached to the NIR absorbing glass, as shown by block 940. An anti-reflective (AR) coating may be applied to the transparent glass and/or the NIR absorbing glass, as shown by block 950.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical system with reduced retroreflection, comprising:

an optical element comprising first and second optic apertures;

first and second retroreflection defeat filters, each comprising a partially obstructing material configured to absorb or reflect a first portion of an optical system waveband while transmitting a second portion of the optical system waveband;

wherein the partially obstructing material of the first retroflection defeat filter is arranged to occupy a first portion of the first optic aperture comprising at least half of the first optic aperture, and the partially obstructing material of the first retroflection defeat filter does not occupy a second portion of the first optic aperture comprising a remainder of the first optic aperture;

wherein the partially obstructing material of the second retroflection defeat filter is arranged to occupy a first portion of the second optic aperture comprising at least half of the second optic aperture, and the partially obstructing material does not occupy a second portion of the second optic aperture comprising a remainder of the second optic aperture; and wherein the first and second retroflection defeat filters are arranged in opposite orientations.

2. The optical system of claim 1, wherein the first and second retroreflection defeat filters further comprise a transmitting material arranged to occupy the second portions of the first and second optic apertures.

3. The optical system of claim 2, wherein the transmitting material is attached to the partially obstructing material.

4. The optical system of claim 1, wherein the partially obstructing material comprises NIR absorbing glass.

5. The optical system of claim 4, wherein the NIR absorbing glass is selected from the group consisting of KG1, KG2, KG3, and KG5.

6. The optical system of claim 1, wherein the retroreflection defeat filter is disposed in a stop of the optical element.

7. A pair of retroreflection defeat filters for reducing retroreflection in an optical system comprising first and second optic apertures, the first retroflection defeat filter comprising:

a partially obstructing material configured to absorb or reflect a first portion of an optical system waveband while transmitting a second portion of the optical system waveband, wherein the partially obstructing material of the first retroflection defeat filter is arranged to occupy a first portion of the first optic aperture comprising at least half of the first optic aperture; and the second retroflection defeat filter comprising:

a partially obstructing material configured to absorb or reflect a first portion of an optical system waveband while transmitting a second portion of the optical system waveband, wherein the partially obstructing material of the second retroflection defeat filter is arranged to occupy a first portion of the second optic aperture comprising at least half of the first optic aperture; and wherein the first and second retroflection defeat filters are arranged in opposite orientations.

8. The pair of retroreflection defeat filters of claim 7, wherein the pair of retroreflection defeat filters each further comprises a transmitting material arranged to occupy the second portion of the first and second optic apertures.

9. The retroreflection defeat filter of claim 8, wherein the transmitting material is attached to the partially obstructing material.

10. The retroreflection defeat filter of claim 8, wherein the transmitting material and/or the partially obstructing material further comprises an anti-reflective (AR) coating.

11. The retroreflection defeat filter of claim 7, wherein the partially obstructing material comprises NIR absorbing glass.

12. The retroreflection defeat filter of claim 11, wherein the NIR absorbing glass is selected from the group consisting of KG1, KG2, KG3, and KG5.

13. A method for a reduced retroreflection reduction filter for an optical system, comprising the steps of:

providing a first retroflection defeat filter, the first retroflection defeat filter further comprising:

a first portion of partially obstructing material configured to absorb part of an optical system waveband while transmitting another part of the optical system waveband; and a second portion not occupied by the partially obstructing material;

positioning a first window within a first optic aperture of the optical system, wherein the window comprises the first retroflection defeat filter, and wherein the first portion occupies at least half of the first optic aperture;

providing a second retroflection defeat filter, the second retroflection defeat filter further comprising:

a first portion of partially obstructing material configured to absorb part of an optical system waveband while transmitting another part of the optical system waveband; and a second portion not occupied by the partially obstructing material;

positioning a second window within a second optic aperture of the optical system, wherein the second window comprises the second retroflection defeat filter, and wherein the first portion occupies at least half of the second optic aperture; and wherein the first and second retroflection defeat filters are arranged in opposite orientations.

* * * * *